April 4, 1961 — W. E. BAUER — 2,977,991
CONTROLLER
Filed Jan. 27, 1958
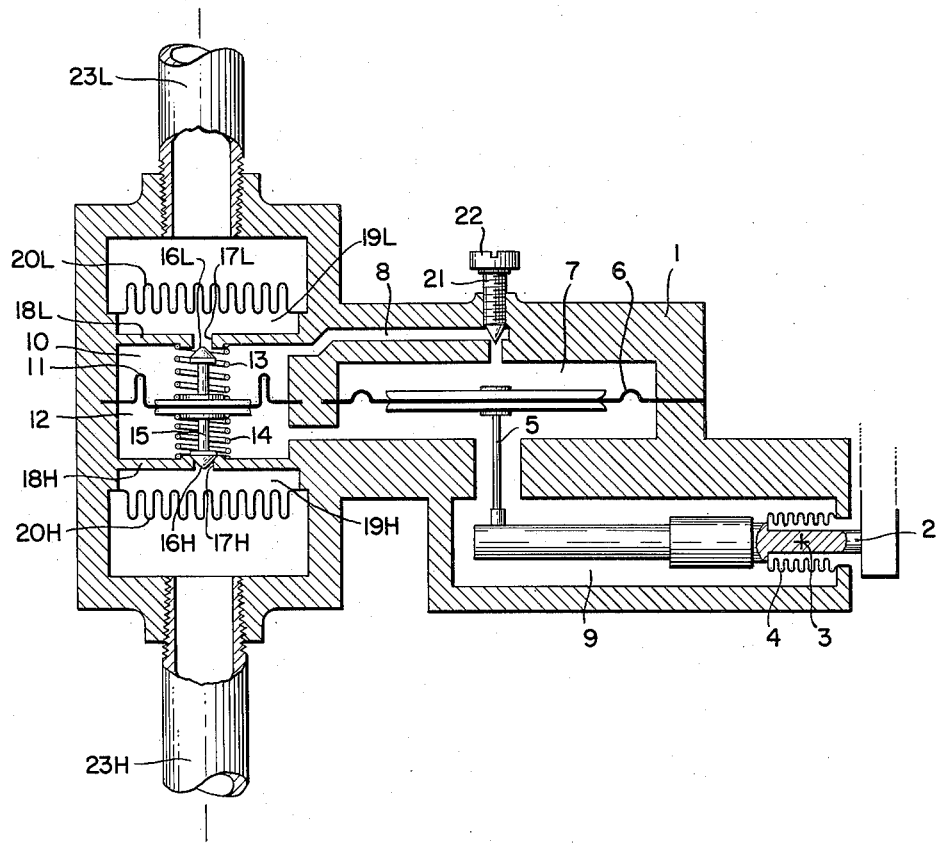
INVENTOR.
WILLIAM E. BAUER
BY Arthur H. Swanson
ATTORNEY.

United States Patent Office 2,977,991
Patented Apr. 4, 1961

2,977,991
CONTROLLER

William E. Bauer, Palmyra, N.J., assignor to Minneapolis-Honeywell Regulator Company, Minneapolis, Minn., a corporation of Delaware Filed Jan. 27, 1958, Ser. No. 711,385

4 Claims. (Cl. 137—781)

This invention relates to means for indicating, recording, and/or controlling in response to a pressure, more specifically, in response to the difference between two pressures.

Devices such as this have many uses, particularly for measuring flow. In order that the device be as sensitive as possible, i.e., as responsive to small differences in pressure, it is necessary that the movable element be light in weight and readily movable. A common form of such a movable element is one or more thin-walled metallic bellows. Such delicate structures must be protected against overload. In order to provide this protection against overload, it is known to employ two or more of these movable elements mounted on a rigid case in such a way as to define one or more closed chambers between them. A substantially incompressible liquid is placed in this closed chamber or chambers. One or more of a pair of valves is each connected to the movable portion of one of the movable elements and arranged to seat against a part of the rigid case. These valves are so arranged that, in the case of an excessive pressure applied to either of the movable elements, one of the valves closes. This traps liquid in the interior of the movable element exposed to the excessive pressure. Since this liquid is substantially incompressible and since the valve seats against a part of the rigid case, the sensitive movable element is protected against breakage due to overload by the liquid trapped within it.

It is a feature of this invention to separate the sensing element, which actuates the output element of the device from the movable element, which actuates the overload valves. In this way the valve operator may be made more sensitive. The valve operator is designed to travel as far as necessary for proper operation of the shut off valves, without requiring the sensing element and output mechanism or elements to travel through similar large distances. One or the other of the overload valves is closed before an excessive pressure is applied to the sensing element.

A better understanding of the present invention may be had from the accompanying drawing and descriptive matter in which:

The single figure of the drawing is a longitudinal cross section through the device.

The device of this invention is disclosed in more or less diagrammatic form since many of the elements may be made in various different ways. A rigid case 1 has its interior divided into various chambers hereinafter referred to. The output element of the device is shown as comprising a takeoff in the form of a beam 2 mounted on a pivot 3 and sealed by a flexible element 4 so that one end of the beam 2 is located in the chamber 9 within the case 1. That end of the take-off 2 which is outside of the case 1 may be used to actuate an indicator, a recorder, or a portion of a controller, either directly, or through an amplifying device. Such amplifying devices may comprise mechanical, electrical, or pneumatic amplifiers which are well known in and of themselves. An example of such a device is to be found in U.S. Patent 2,808,725; patented October 8, 1957 to Booth Dubois and West.

That end of take-off 2 which is within case 1 is pivotally connected by means of link 5 to sensing element 6. Sensing element 6 is shown as a diaphragm sealed to case 1 at its rim and having its center movable and dividing the interior of case 1 into two operating chambers 7 and 9. Chamber 7 communicates with a connecting chamber 8 which, in turn, communicates with a valve chamber 10. Chamber 9 communicates with a valve chamber 12.

Chambers 10 and 12 are separated by a valve operator 11 shown as a flexible diaphragm sealed at its rim to case 1 and having its central portion movable.

Valve operator 11 is biased to a position intermediate of its path of travel by springs 13 and 14. The movable portion of valve operator 11 carries valve rod 15.

Valve rod 15 operates two overload valves. Since these overload valves are duplicates, a description of one will suffice. Each overload valve has the same reference characters applied to it, distinguished by L for the overload valve on the low pressure side and by H for the overload valve on the high pressure side.

Valve operator 15 carries valve 16L which cooperates with a valve seat 17L in a rigid partition 18L which separates chamber 10 from inlet chamber 19L. The opposite side of inlet chamber 19L is closed by a seal 20L formed by a slack diaphragm secured at its rim to case 1 and having its central portion movable.

Case 1 has a pair of inlet connections passing through its wall. Inlet connection 23L is for low pressure and leads to the outer face of seal 20L. Inlet connection 23H is for high pressure and leads to the outer face of seal 20H.

Means are provided for damping out small, unwanted changes in pressure applied to the sensing element 6. These damping means comprise a screw 21 which separates chamber 7 from chamber 8. Screw 21 is manually adjustable by means of head 22 so as to vary the amount of opening between chambers 7 and 8 and thereby vary the rate at which liquid can flow into or out of chamber 7.

Chambers 19L, 10, 7, and 8 constitute a conduit adapted to be filled with a substantially incompressible liquid. Chambers 19H, 12, and 9 constitute a second conduit adapted to be filled with a separate quantity of the same or a like substantially incompressible liquid.

The operation of this device is as follows. Assume that the pressure applied to the outer face of seal 20L is the same as the pressure applied to the outer face of seal 20H. The device is therefore at rest and both overload valves 16L and 16H are out of engagement with their cooperating valve seats.

Now assume the pressure applied to the outer face of seal 20H to increase. This increase in pressure causes the movable portion of seal 20H to move. This increases the pressure in chambers 19H, 12, and 9. This increase in pressure in chamber 9 causes the sensing element 6 to move upward. This movement of sensing element 6 causes the left end of take-off 2 to move upward about its pivot 3 and thereby causes the right end of take-off 2 to move downward and actuate the indicator, recorder or controller element attached to it.

This movement of sensing element 6 need only be exceedingly minute, of the order of a few thousandths of an inch and is completed to the limit of movement before the valve operator closes the corresponding one of the overload valve. If the pressure applied to the outer face of seal 20L exceeds the pressure applied to the outer face of seal 20H sensing element 6 moves in the opposite direction. If the pressure applied to the outer face of seal 20L becomes excessive, valve operator 11 is moved against the stress of spring 14 and causes overload valve 16H to close against the valve seat 17H. This traps liquid in chamber 19H and in chambers 12 and 9. Since this liquid is substantially incompressible, seal 20L, sensing element 6, and valve operator 11 are supported by the liquid trapped behind them and therefore can withstand the pressure applied to them. This is the position in which the device is shown in the drawing.

The overload valves 16L and 16H can be constructed so that they are in the chambers 19L and 19H, respectively, and the valve seats 17L and 17H are each on the opposite side of the partitions 18H and 18L to that in which they are shown in the drawing. If the overload valves are constructed as just suggested, an excessive pressure applied to the outer face of seal 20H would trap liquid in the chamber 19H and would protect the seal 20H and, consequently, the sensing element 6 and the valve operator 11 from excessive pressure.

What is claimed is:

1. A device responsive to pressure, including, a rigid case having an inlet connection passing through the wall thereof, a seal mounted in said case and separating said inlet connection from an inlet chamber adapted to contain a substantially incompressible liquid, an overload valve adapted to control a connection between said inlet chamber and a valve chamber and adapted to contain a substantially incompressible liquid and communicating therewith when the overload valve between them is open, a movable valve operator connected to said overload valve so as to close said valve or to hold said valve open and mounted in said case, a sensing element which is operable independently of said valve operator and is less sensitive to pressure than said valve operator and which is mounted in said case and separating the interior of said case into an operating chamber adapted to contain a substantially incompressible liquid and communicating with said valve chamber, and a take-off passing through the wall of said case and having operative connection with said sensing element so as to be moved thereby.

2. A device responsive to pressure, including, a rigid case, a sensing element movably mounted in said case and dividing the interior thereof into two operating chambers, a valve operator mounted in said case and operable independently of said sensing element and having a movable portion more sensitive to a given pressure than said sensing element and dividing the interior thereof into two valve chambers communicating with said operating chambers, partitions forming part of said case and each dividing one of said valve chambers from an inlet chamber, valve seats each forming the rim of an opening through one of said partitions, valves cooperating with said valve seat and actuated by said valve operator, and seals each forming a wall of one of said inlet chambers away from said partition, said chambers being adapted to contain a substantially incompressible liquid.

3. A device responsive to pressure, including, a rigid case, a sensing element movably mounted in said case and dividing the interior of said case into a pair of operating chambers, a valve operator movably mounted in said case and operable independently of said sensing element and separating the interior of said case into a pair of valve chambers each communicating with one of said operating chambers, said valve operator having a greater movement for the same amount of pressure than said sensing element, and a pair of overload valves operated by said valve operator and each adapted to control the flow of liquid to or from one of said valve chambers or to trap liquid in one of said valve chambers and one of said operating chambers, said chambers being adapted to contain a substantially incompressible liquid.

4. In a pressure responsive device having a sensing element adapted to move in response to a difference in pressure applied to the opposite faces thereof, the improvement comprising an overload protecting device consisting of, a rigid case in which said sensing element is mounted and having inlet conduits passing through the wall thereof, a pair of seals each mounted in said case and each located between one of said inlet conduits and a liquid-filled conduit formed in the interior of said case and located on opposite sides of said sensing element, a valve operator separate from and operable independently of said sensing element and mounted in said case and exposed on its opposite faces to the pressure of the liquid in said conduit and more sensitive to pressure than said sensing element is, and a pair of overload valves each controlling the flow of liquid through one of said conduits and adapted to trap liquid in said conduit and thereby support said sensing element and said valve operator by said liquid against excessive pressure applied thereto.

References Cited in the file of this patent

UNITED STATES PATENTS

| | | |
|---|---|---|
| 2,276,580 | Hofer | Mar. 17, 1942 |
| 2,632,474 | Jones | Mar. 24, 1953 |
| 2,651,317 | Heinz | Sept. 8, 1953 |
| 2,752,949 | Jones | July 3, 1956 |